US008570145B2

(12) United States Patent
Au et al.

(10) Patent No.: US 8,570,145 B2
(45) Date of Patent: Oct. 29, 2013

(54) SECURITY SYSTEM, MODULES AND METHOD OF OPERATION THEREOF

(75) Inventors: Jonson Chung-shun Au, Fremont, CA (US); Melvin Sik Yu Li, Fremont, CA (US)

(73) Assignees: Jonson C. Au, Fremont, CA (US); Melvin S. Li, Fremont, CA (US)

( * ) Notice: Subject to any disclaimer, the term of this patent is extended or adjusted under 35 U.S.C. 154(b) by 0 days.

(21) Appl. No.: 13/540,629

(22) Filed: Jul. 3, 2012

(65) Prior Publication Data

US 2012/0313750 A1 Dec. 13, 2012

Related U.S. Application Data

(63) Continuation-in-part of application No. 12/367,554, filed on Feb. 9, 2009, now abandoned.

(51) Int. Cl.
*G05B 19/00* (2006.01)
*B60R 25/00* (2013.01)
*B60R 25/10* (2013.01)

(52) U.S. Cl.
USPC .................... 340/5.61; 340/5.72; 340/426.36; 340/426.15; 455/420

(58) Field of Classification Search
USPC ......... 340/425.15, 5.3, 5.72, 5.61, 5.62, 5.63, 340/5.64; 455/419–420
See application file for complete search history.

(56) References Cited

U.S. PATENT DOCUMENTS

| | | | | |
|---|---|---|---|---|
| 5,650,774 | A | 7/1997 | Drori | |
| 2003/0210128 | A1 | 11/2003 | Dix et al. | |
| 2005/0123071 | A1 * | 6/2005 | Okada et al. | 375/316 |
| 2005/0134477 | A1 * | 6/2005 | Ghabra et al. | 340/825.72 |
| 2005/0248436 | A1 | 11/2005 | Hohmann et al. | |
| 2006/0220806 | A1 | 10/2006 | Nguyen et al. | |

* cited by examiner

*Primary Examiner* — Steven Lim
*Assistant Examiner* — Omeed Alizada
(74) *Attorney, Agent, or Firm* — Melvin S. Li

(57) ABSTRACT

The present invention is concerned with a security system. The system may comprise at least a first handheld device, a second handheld device, a first secure entity, and a second secure entity. The first handheld device and the first secure entity are electronically pre-registered with each other, the first handheld device and the second secure entity are electronically pre-registered with each other, the second handheld device and the first secure entity are electronically pre-registered with each other, and the second handheld device and the second secure entity are electronically pre-registered with each other, with pre-registration of each respective handheld device and secure entity pair establishing a unique channel for the respective handheld device and secure entity pair.

10 Claims, 9 Drawing Sheets

An example of wireless signal content: Signal *H1.1* contains <*H1*> as handheld's Identification Code and <*1*> as handheld's Channel Code

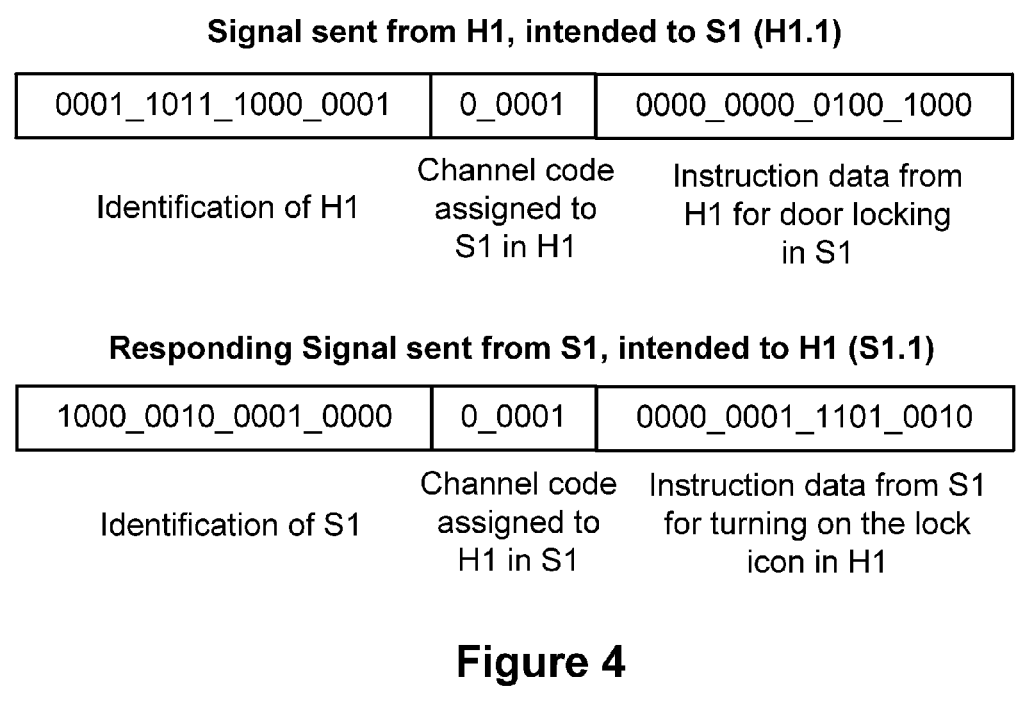

Signal sent from H1, intended to S1 (H1.1)

| | | |
|---|---|---|
| 0001_1011_1000_0001 | 0_0001 | 0000_0000_0100_1000 |
| Identification of H1 | Channel code assigned to S1 in H1 | Instruction data from H1 for door locking in S1 |

Responding Signal sent from S1, intended to H1 (S1.1)

| | | |
|---|---|---|
| 1000_0010_0001_0000 | 0_0001 | 0000_0001_1101_0010 |
| Identification of S1 | Channel code assigned to H1 in S1 | Instruction data from S1 for turning on the lock icon in H1 |

Figure 4

Signal sent from H1, intended to S2 (H1.2)

| | | |
|---|---|---|
| 0001_1011_1000_0001 | 0_0010 | 0000_0000_0100_1000 |
| Identification of H1 | Channel code assigned to S2 in H1 | Instruction data from H1 for door locking in S2 |

Responding Signal sent from S2, intended to H1 (S2.1)

| | | |
|---|---|---|
| 1000_0011_0010_0100 | 0_0001 | 0000_0001_1101_0010 |
| Identification of S2 | Channel code assigned to H1 in S2 | Instruction data from S2 for turning on the lock icon in H1 |

Figure 5

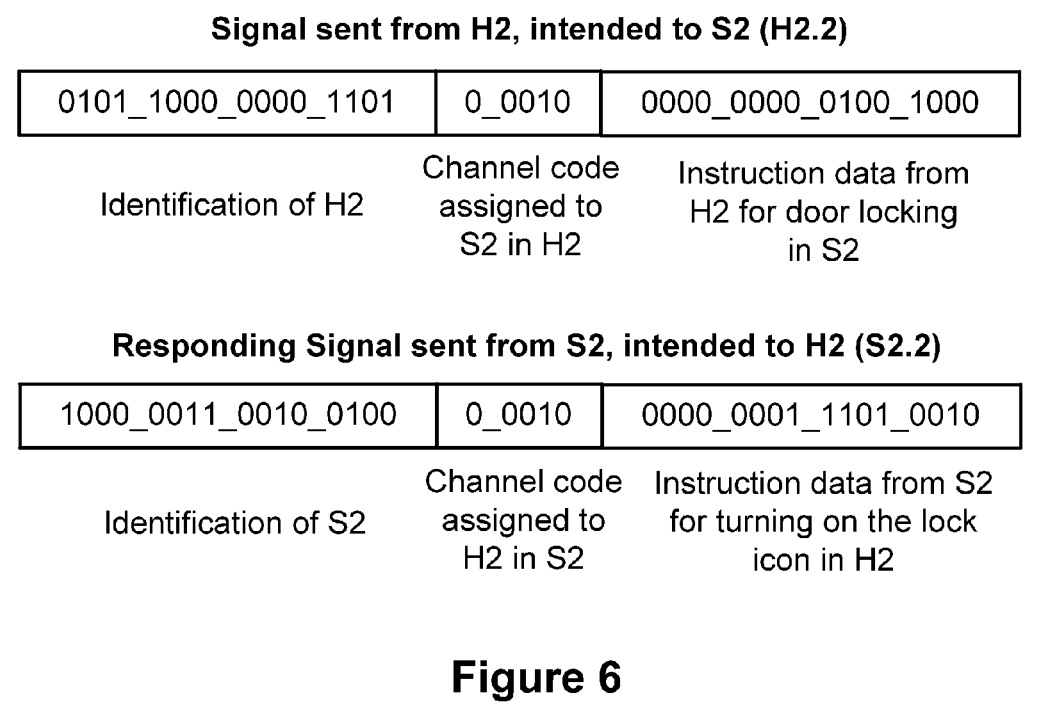

Signal sent from H2, intended to S2 (H2.2)

| | | |
|---|---|---|
| 0101_1000_0000_1101 | 0_0010 | 0000_0000_0100_1000 |
| Identification of H2 | Channel code assigned to S2 in H2 | Instruction data from H2 for door locking in S2 |

Responding Signal sent from S2, intended to H2 (S2.2)

| | | |
|---|---|---|
| 1000_0011_0010_0100 | 0_0010 | 0000_0001_1101_0010 |
| Identification of S2 | Channel code assigned to H2 in S2 | Instruction data from S2 for turning on the lock icon in H2 |

Figure 6

Handheld Unit

SECURITY SYSTEM, MODULES AND METHOD OF OPERATION THEREOF

RELATED APPLICATION

The present invention is a continuation-in-part application from U.S. patent application Ser. No. 12/367,554 filed Feb. 9, 2009, content of which is incorporated herein in its entirety.

FIELD OF THE PRESENT INVENTION

The present invention is concerned with a security system for controlling access to one or more secure entities by one or more users. The present invention is also concerned with, but not limited to, modules of such security system, a method of providing such security system, a method of operating or implementing such security system and a platform of allowing different modules being compatible with each other in such security system.

BACKGROUND OF THE PRESENT INVENTION

Mechanical locks and keys have been used for thousands of years for controlling access to premises. Nowadays, it is still typical that a user would require two mechanical keys to gain access to his/her residence. One of the mechanical keys may be for the knob-type lock on the main door to the residence and the other mechanical key may be for the dead-bolt lock for added security. Then the user may have a further mechanical key for his/her primary car and a further electronic remote alarm device for the car. If the user has a second car or has access to the spouse's car, s/he may have two more electronic handheld devices to carry with the key chain. In addition, s/he may have one or two more mechanical or electronic keys or card keys for access to his/her work place. As can be realized, the user can easily be carrying about ten keys of different types. This is very cumbersome.

The present invention seeks to provide a solution to the above described problem, or at least to provide an alternative to the general public.

SUMMARY OF THE INVENTION

According to a first aspect of the present invention, there is provided a security system, comprising at least a first handheld device, a second handheld device, a first secure entity, and a second secure entity, wherein a) the first handheld device and the first secure entity are electronically pre-registered with each other, the first handheld device and the second secure entity are electronically pre-registered with each other, the second handheld device and the first secure entity are electronically pre-registered with each other, and the second handheld device and the second secure entity are electronically pre-registered with each other, with pre-registration of each respective handheld device and secure entity pair establishing a unique channel for the respective handheld device and secure entity pair, b) each said unique channel is configured to allow two-way communication by encoded wireless signals between the respective handheld device and secure entity pair, c) the encoded signals include a first signal emitted from the handheld device intended for the secure entity of the respective handheld device and secure entity pair, and a second signal emitted from the secure entity intended for the handheld device of the respective handheld device and secure entity pair, with the second signal generated only in response to the first signal and actionable by the handheld device of the respective handheld device and secure entity pair, d) each of the first signal and the second signal contains coding of at least a first part, a second part and a third part, e) the first part coding of the first signal represents an identification of said handheld device of the respective handheld device and secure entity pair, the second part coding of the first signal represents a channel code designated in said handheld device with respect to said secure entity of the respective handheld device and secure entity pair, and the third part coding of the first signal represents an instruction from said handheld device to said secure entity of the respective handheld device and secure entity pair. Preferably, the first part coding of the second signal may represent an identification of the secure entity of the respective handheld device and secure entity pair, the second part coding of the second signal may represent a channel code designated in the secure entity with respect to the handheld device of the respective handheld device and secure entity pair, and the third part coding of the second signal may represent an instruction from the secure entity to the handheld device of the respective handheld device and secure entity pair. With such configuration, only signals from the respective handheld device intended for the respective secure entity will be responded by the respective secure entity and only signals from the respective secure entity generated in response to the signals from the respective handheld device will be responded by the respective handheld device.

Preferably, the handheld devices may be remote control key fobs or cellular phones, and the secure entities may be vehicles, premises or computers.

In an embodiment, the said handheld devices may include means for a user to input command for emitting the wireless signal. The input means may be one or more physical and/or virtual touch-screen keys or buttons.

In one embodiment, the first signal encoding the instruction for a desired predetermined action may be selected from a group including:

(i) locking or unlocking the first secure entity,
(ii) arming or disarming the first secure entity;
(ii) allowing or disallowing access to the first secure entity;
(iii) activating or deactivating the first secure entity; and
(iv) checking locked/unlocked status of the first secure entity.

Suitably, the handheld devices may include means for displaying and/or indicating status of the secure entity in the respective handheld device and secure entity pair.

In a specific embodiment, the encoded wireless signals may be of radio frequency.

In a useful embodiment, the security system may comprise one or more handheld devices registrable with one or more of the secure entities. Additionally or alternatively, the security system may comprise one or more secure entities registrable with one or more of the handheld devices. Such feature(s) can leaving room for expansion when more handheld devices and/or more secure entities are acquired Advantageously, at least one of the secure entities may be configured to emit a third wireless signal for indication of an exception event when a predetermined status is detected by the secure entity, and wherein the third wireless signal is independent of the first and second signals. The security system may be configured such that one of the handheld devices or at least one handheld device is respondable to the third wireless signal, leading to a corresponding indication on the handheld device(s).

BRIEF DESCRIPTION OF THE DRAWING

The present invention will be explained by ways of non-limiting examples, with reference to the attached drawings, in which:

FIG. 4 is a data content diagram showing the working of two unique communication links of a module pair of FIG. 3;

FIG. 5 is a data content diagram showing the working of two unique communication links of one of the other module pairs of FIG. 3;

FIG. 6 is a data content diagram showing the working of two unique communication links of yet one of the other module pairs of FIG. 3;

DETAILED DESCRIPTION OF PREFERRED EMBODIMENTS OF THE PRESENT INVENTION

The present invention seeks to provide a solution which allows a (or "each") user to carry only one handheld device, and with which, the user will not need to carry multiple devices for gaining access to multiple secure entities or premises. The secure entity may be a vehicle, premises such as a residence or an office, or a computer, control of access thereto is required. Significantly, the system is configured such that the handheld device is adapted to provide an indication of the status of a particular or target secure entity or premises, the particular or target secure entity or premises being the entity or premises to which the handheld device has just sent an initial signal and the particular or target entity or premises has accordingly responded to the signal. The provision of the indication of the status is achieved after the particular or target entity has emitted a feedback signal, the feedback signal emitted in response to the initial signal. It is to be noted that the feedback signal is specific, in that the feedback is responded to by the handheld device that has sent the initial signal in the first place, and not responded by other handheld device(s) despite these other handheld devices having pre-registered with the particular or target entity. Different embodiments of the invention are now illustrated below.

Embodiment 1

Figure 1:
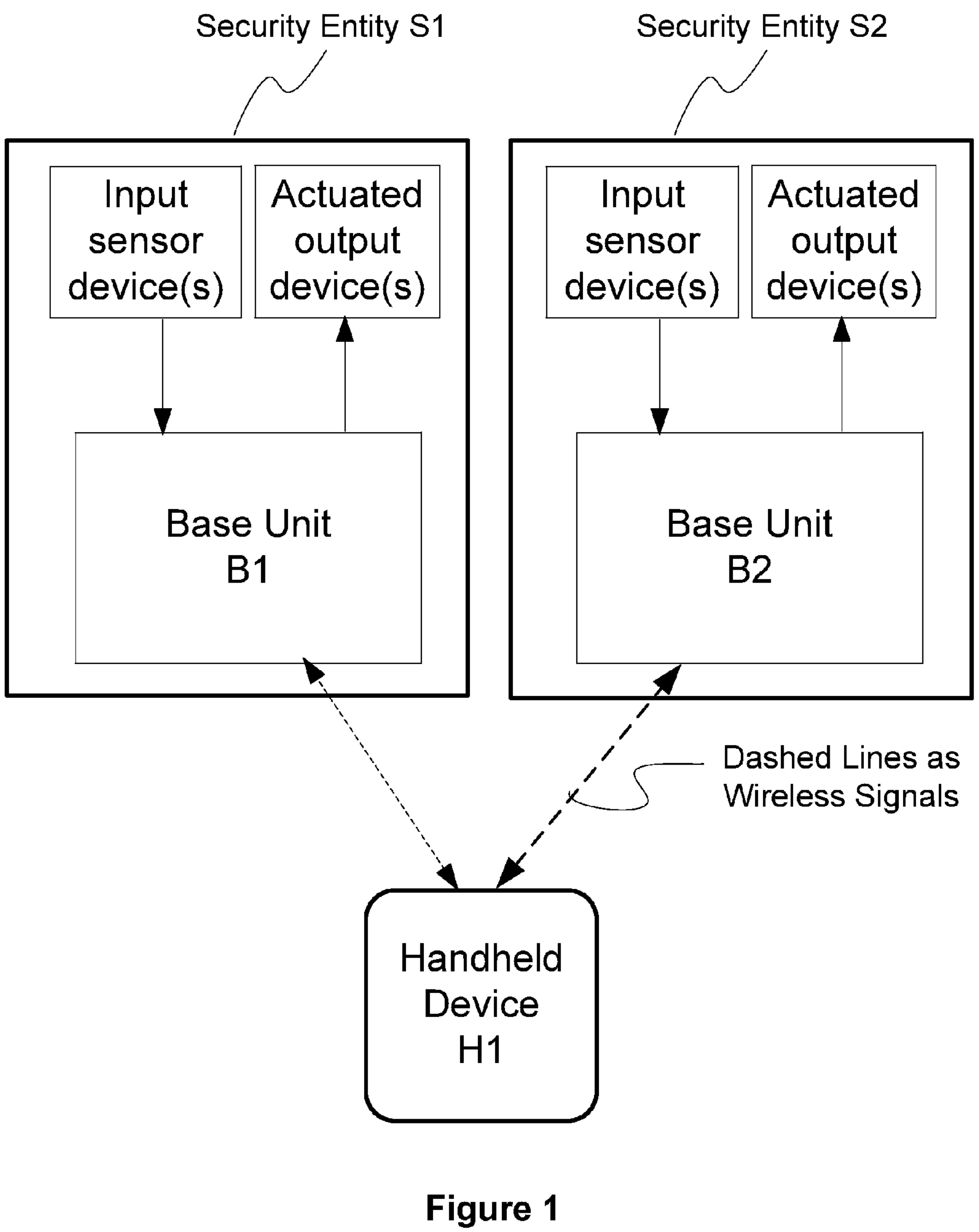
FIG. 1 is a schematic diagram showing different modules and their relationship in an embodiment of a security system in accordance with the present invention.

FIG. 1 illustrates, schematically, a first embodiment of a security system in accordance with the present invention. The security system comprises a number of module types. The module types include a first module type or a handheld device, e.g. H1. Handheld device H1 is relatively compact and the appearance resembles a car remote control device that is currently available on the market. In this embodiment, handheld device H1 has a total of six button-type keys, namely K1, K2, K3, K4, K5, K6, and one liquid crystal display. Handheld device H1 is configured to emit up to six different wireless signals. Depending on which of the keys is depressed a corresponding signal is emitted. The security system further comprises a second module type or a first secure entity. In this embodiment, the secure entity S1 is a conventional vehicle except in the present invention it is provided with a base unit B1 with which handheld H1 can communicate. In other words, handheld device H1 serves as a key for access to both vehicles S1, S2.

In this embodiment, when vehicle S1 is first purchased, it is purchased with handheld device H1. Specifically, handheld device H1 and vehicle S1 are pre-registered with each other before they can be put into use. Details of the pre-registration will be explained in further detail later in the description. Once the pre-registration process has taken place, handheld device H1, on depressing of key K1, emits a first wireless signal detectable by a receiver in base unit B1 of the first vehicle S1. The first wireless signal includes codes encoding a first instruction for locking all doors of vehicle S1. The receiver of vehicle S1, on receiving the first wireless signal, reacts by sending a corresponding signal to a microprocessor in base unit B1, which in turn sends a "lock" signal to all the doors, in accordance with the first instruction. On completion of the locking of all the doors, a signal is generated by base unit B1 to a wireless signal transmitter for transmitting a second wireless signal from vehicle S1 to handheld H1 for confirming the action of locking all the doors of the vehicle S1. Handheld device H1, on receiving the second wireless signal from vehicle S1, will display on the LCD display the status of the doors of vehicle S1, i.e. the locked status of the doors. With this, when the user desiring to check whether the doors have been locked, s/he can simply look to the LCD display of handheld device H1 for the status of the doors. This is to be contrasted with conventional systems in which after a user being away from the vehicle at a long distance and having forgotten whether s/he had in fact locked the doors or armed the vehicle s/he would have no way of knowing the status of the vehicle. S/he would either have to return closer to the vehicle and lock or arm the vehicle again or have to live with being paranoid about whether the vehicle would be vulnerable to be tampered with. Details of the working of the codes will be explained in further detail later in the description.

In this embodiment, the key K2 is designated for unlocking all the doors in vehicle S1. Handheld device H1, on depressing of key K2, emits a third wireless signal detectable by vehicle S1. The receiver of vehicle S1, on receiving the third wireless signal, reacts by sending a corresponding signal to the microprocessor in base unit B1, which in turn sends a "unlock" signal to all the doors. Once the doors are unlocked, a fourth wireless signal is generated from vehicle S1. Handheld device H1, on receiving the fourth wireless signal, displays on the LCD the status of the doors of vehicle S1 as "unlocked".

When the user of vehicle S1 subsequently purchases a second secure entity or vehicle S2, he has an option of acquiring a new handheld device having pre-registered with vehicle S2. This is however undesirable because it would mean that the user would have to carry one more piece of hardware. Another more convenient option, as enabled by the present invention and as in this embodiment, would be to register vehicle S2 with his handheld device H1 so that the same handheld device H1 can control access to vehicle S2 in certain specific ways, details of which will be explained later in this description. Details of the pre-registration will also be explained in further detail later in the description. After the pre-registration, keys K3 and K4 are designated for locking and unlocking of the doors of vehicle S2, respectively, in a similar fashion as keys K1 and K2 designated for the locking and unlocking of vehicle S1, respectively.

After the purchase of vehicle S2, there is still capacity left in handheld device H1 for subsequent changes in the future in case the user would like to change the designation of keys periodically for security reasons or for further expansion in case the user acquires a third vehicle. As can be understood from above, the user requires only one electronic key for access to two or more vehicles. Even when the user acquires a third vehicle in the future, still he can register or program the same handheld device to access to the third vehicle and there is no need to acquire a third piece of hardware for access thereto.

Embodiment 2

Figure 2:
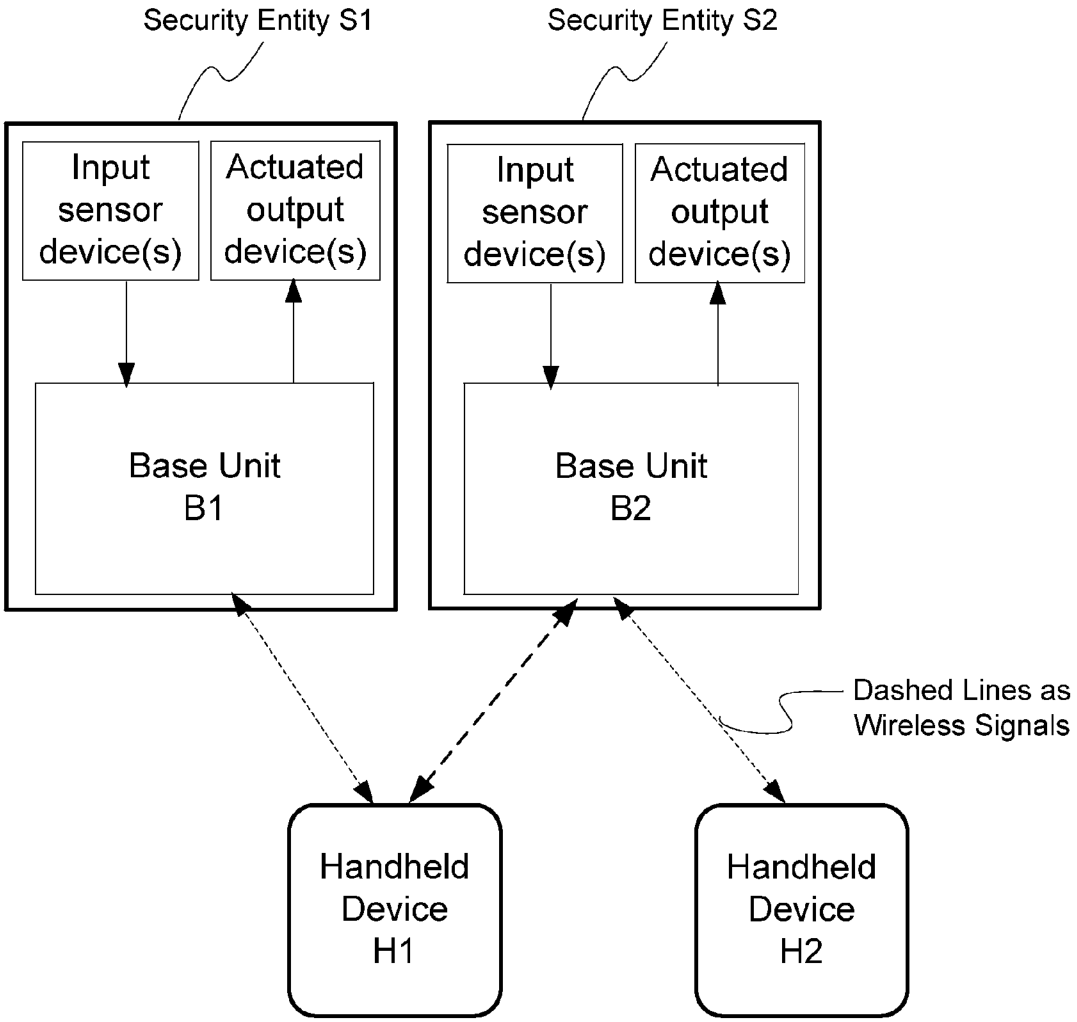
FIG. 2 is a schematic diagram showing different modules and their relationship in another embodiment of a security system in accordance with the present invention.

FIG. 2 is a schematic diagram illustrating a second embodiment of a security system in accordance with the present invention. The security system is generally similar to the security system of FIG. 1. One main difference is that there are two handheld devices H1, H2 involved, with one of the handheld devices H1 in possession at all times by a first user. The first user relies on handheld H1 to access both vehicles S1 and S2. In this embodiment, for sake of illustration, this first user has just married a second user, i.e. the spouse, who will require access to one of the two vehicles (i.e. vehicle S2) that the first user owns. To achieve this, handheld device H2 similar to the handheld device H1 is purchased for the spouse. Before second handheld device H2 and second vehicle B2 can recognize each other, the second user will need to pre-register handheld device H2 and vehicle S2 to recognize each other. Details of the pre-registration will be explained in further detail later in the description. However, once the pre-registration process has taken place, handheld device H2, on depressing of key K1, emits a fifth wireless signal detectable by a receiver in base unit B2 of vehicle S2. The fifth wireless signal includes codes encoding an instruction for locking all doors of vehicle S2. The receiver of vehicle S2, on receiving the wireless signal, reacts by sending a corresponding signal to a microprocessor in base unit B2 to lock all the doors, in accordance with the instruction. On completion of the locking of all the doors, a signal is generated to a wireless signal transmitter for transmitting a sixth wireless signal from vehicle S2 to handheld H2 for confirming the action of locking all the doors of vehicle S2. Handheld device H2, on receiving the sixth wireless signal from vehicle S2, displays on the LCD display the status of the doors, i.e. the locked status of the doors. With this, when the user desiring to check whether the doors have been locked can simply look to the LCD display of handheld device H2 for the status of the doors. This is to be contrasted with conventional systems in which after a user being away from the vehicle at a long distance and having forgotten whether s/he had in fact locked the doors or armed the vehicle would have no way of knowing the status of the vehicle. S/he would either have to return closer to the vehicle and lock or arm the vehicle again or have to live with being paranoid about whether the vehicle would be vulnerable to be tampered with. Details of the working of the codes will be explained in further detail later in the description.

The working of the above two embodiments is contributed by steps for establishing unique communication in pre-registration, to be explained as follows.

Pre-Registration of H1 and S1 with Each Other

When vehicle S1 and handheld device H1 are first purchased, they are considered as virgin and not readily able to emit signals for carrying instructions respondable by each other. Thus, they will need to undergo a pre-registration process in order to create designated channels via which instructions from handheld device H1 intended for vehicle S1 and instructions from vehicle S1 intended for handheld device H1 are transmitted wirelessly.

Step 1: In this embodiment, the process is initiated by generating identification for handheld device H1. The process is started by putting handheld device H1 into a pre-registration mode. The identification is generated by the user manually or machine randomly selecting a code (or identification code) out of a pool of codes provided to handheld device H1. Each code is defined by a 16-digit binary code, and thus a total of 65536 codes (2 to the power of 16 or $2^{16}$). After selecting the identification code, it then becomes registered in handheld device H1 and the identification of handheld device H1. Any signal emitted from handheld device H1 will then carry this selected identification code. The identification code is stored in handheld device H1's non-volatile memory.

Step 2: After the identification of handheld device H1 has been determined, a channel code with respect to vehicle S1 is to be selected so that signals carrying instructions for vehicle S1 generated by handheld device H1 will always carry this channel code. This channel code is similar to the identification code as described above although the number of digits of the channel code is only five (5) in this embodiment. In other words, the channel code is selected out of a total of 32 (2 to the power of 5 or $2^5$). The number 32 also represents the maximum number of secure entities with which handheld device H1 can register. In an alternative embodiment, handheld device H1 may be configured such that a smaller pool of channel codes out of the maximum available number of channel codes is available for selection by the user. The use of a smaller pool of channel codes allows the user to select more easily. The channel code is stored in handheld device H1's non-volatile memory.

Step 3: After the channel code of handheld device H1 with respect to vehicle S1 has been determined, vehicle S1 is also to be put into a pre-registration mode. Handheld device H1 is then caused to emit a signal carrying its identification code and the channel code with respect to vehicle S1 for reception by vehicle S1. On receiving this signal, vehicle S1 registers this signal and will only respond to instructions from handheld device H1 only when the instructions are carried with this combination of identification code and channel code. This combination of identification code and channel code of handheld device H1 is stored in a non-volatile memory in vehicle S1.

Step 4: Once the combination of identification code and channel code from handheld device H1 has been stored in vehicle S1, vehicle S1 is then caused to select an identification code for itself, and also a channel code with respect to handheld device H1 only. The codes are stored in vehicle S1's non-volatile memory. Vehicle S1 is then caused to emit a signal carrying its identification code and the channel code with respect to handheld device H1. On receiving this signal, handheld device H1 registers this signal and will only respond to instructions from vehicle S1 when the instructions are carried with this combination of identification code and channel code. This combination of identification code and channel code is stored in a non-volatile memory in handheld device H1.

Once the above steps have been completed, all signals emitted from handheld device H1 intended for vehicle S1 are respondable by vehicle S1 only and vice versa.

Pre-Registration of H1 and S2 with Each Other

When the user of handheld device H1 has subsequently acquired vehicle S2, he will need to similarly pre-register his existing handheld device H1 and new vehicle S2 with each other so that only signals emitted from handheld device H1 and intended for vehicle S2 will be respondable by vehicle S2 and vice versa. Since an identification code has already been designated to handheld device H1, step 1) is not needed and not to be repeated, but steps 2) to 4) are to be followed. However, when a channel code in handheld device H1 with respect to vehicle S2 is to be selected, a channel code different from that with respect to vehicle S1 is to be used. This is to ensure that signals from handheld device H1 intended for vehicle S2 will not be respondable by vehicle S1. The same applies to selecting a channel code in vehicle S2 with respect to handheld device H1.

Pre-Registration of H2 and S2 with Each Other

When the user of handheld H1 has married and would like to provide his spouse with access to vehicle S2 only, they purchase a new virgin handheld device H2 which is similar to handheld device H1. In order to allow handheld device H2 and vehicle S2 to respond to instructions intended for each other, they will need to similarly pre-register new handheld device H2 and vehicle S2 with each other based on the above principle and steps so that only signals emitted from handheld device H2 intended for vehicle S2 will be respondable by vehicle S2 and vice versa. Of course, when a channel code in vehicle S2 with respect to handheld device H2 is to be selected, a channel code different from that with respect to handheld device H1 is to be used. This is to ensure that signals from vehicle S2 intended for handheld device H2 will not be respondable by handheld device H1.

The above steps illustrate how a handheld device and a secure entity can register with each other and how to create a designated secure channel via which communication between the respective pair of handheld device and the secure entity can take place. It is however to be noted that the handheld device and the secure entity can be reprogrammed from time to time for security reason such that a different identification and/or a different channel is/are selected. It is also to be noted that a new designated secure channel can be created by using a combination of an old identification code and a new channel code, a new identification code and an old channel code or a new identification code and a new channel code for a pair of existing module and a new module.

Figure 9:
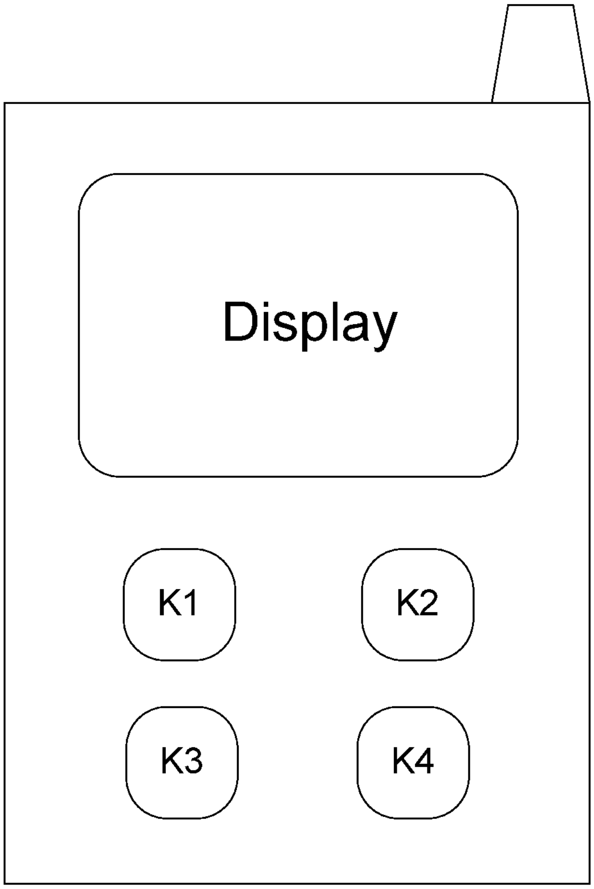
FIG. 9 is a schematic diagram showing the layout appearance of an embodiment of a handheld device in accordance with the present invention.

In another embodiment, there is an application in which once a new secure entity is acquired by a user, s/he depresses a key on a her/his handheld, K4 of FIG. 9 for longer than 5 seconds (that s/he already has for his/her other existing secure entity(ies)) and also activates the new secure entity (for example by depressing a key of the secure entity corresponding to key K4 of the handheld device), in either sequence, to enter into the pre-registration mode. The user must do the pre-registration process one pair at a time if there is more than one pair of modules to program. After the relevant pair of modules enter into the pre-registration mode, the user depresses and releases key K4 of the handheld device normally—that is, duration of depressing on the button is shorter than 5 seconds—one or more times until a desired unused channel is shown on the display of handheld. Then, s/he depresses K4 for longer than 5 seconds to start the pre-registration process. During the process, the handheld broadcasts its identification and the channel selected; the secure entity receives and registers them, followed by returning another broadcast signal containing its own identification together with an unused channel of its own back to the handheld. Once the secure entity returns the aforementioned data, it exits the pre-registration mode; likewise, once the handheld receives and registers the returned data from secure entity, it exits the pre-registration mode as well, thereby completing the programming process of pre-registration. Since the handheld device and the new secure entity are the only ones in the proximity set in pre-registration mode at any given time, only they are respondable to the signals broadcasted from each other.

Figure 3:
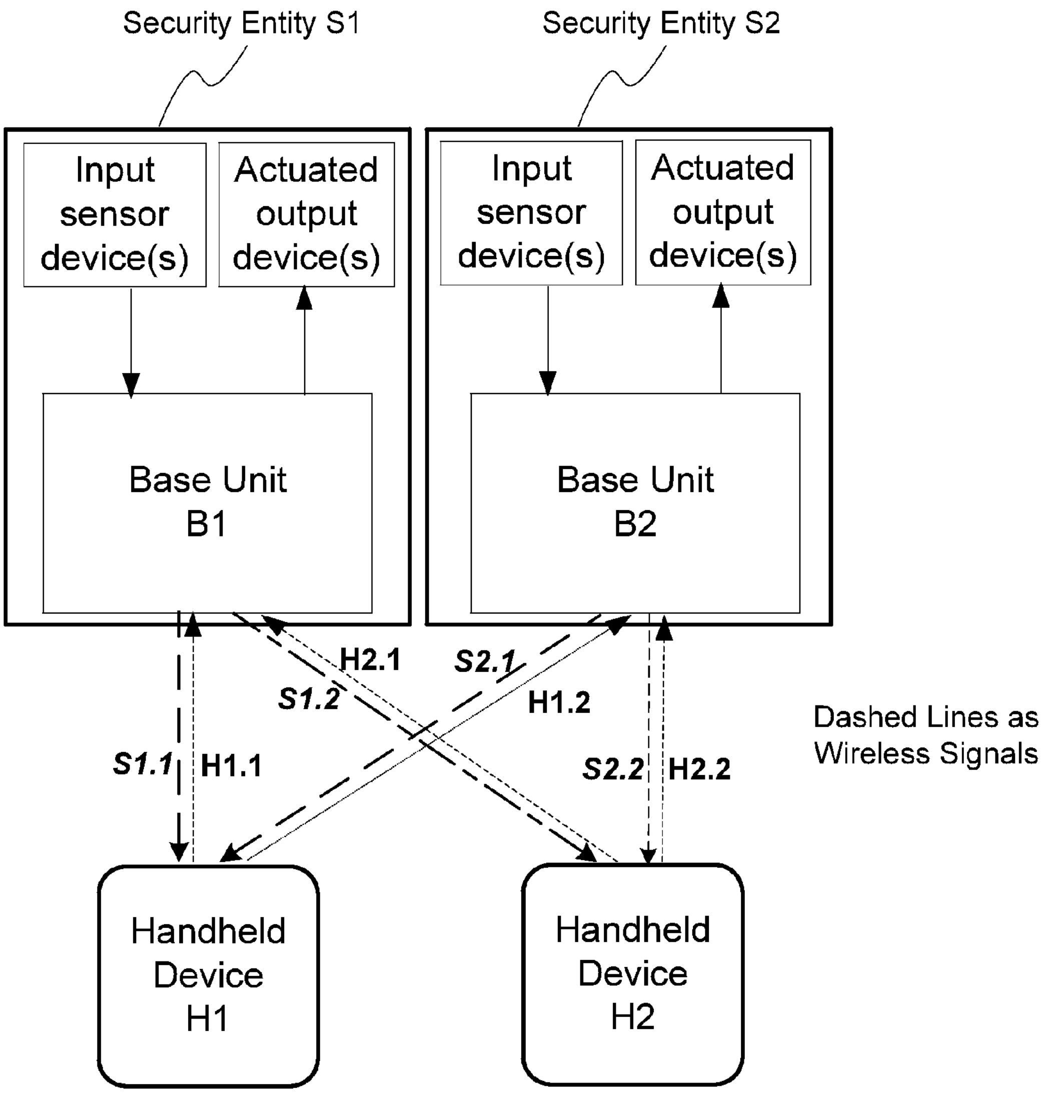
FIG. 3 is a schematic diagram corresponding to FIG. 2 but with more information showing unique communication links of the different modules.

FIG. 3 is similar to FIG. 2 although it contains further details illustrating each unique channel or communication link for each pair of handheld device-secure entity. For example, communication of instructions between handheld unit H1 and base unit of secure entity S1 is conducted exclusively via channels with notations H1.1 and S1.1. That is, signals from handheld H1 intended for vehicle S1 always carry the identification code of handheld device H1 and the channel code "1" of H1, wherein vehicle S1 will not respond to any signal carrying whatever instructions from H1 unless the signal includes the code string H1.1. Similarly, signals from vehicle S1 intended for handheld H1 always carry the identification code of vehicle S1 and the channel code "1" of S1, wherein handheld device H1 will not respond to any signal carrying whatever instructions from S1 unless the signal includes the code string S1.1, S2.1, etc. Communication between handheld device H1 and vehicle S2 is conducted exclusively in channels designated with code strings H1.2 and S2.1, corresponding to first signal transmission from H1 to S2 and second signal transmission from S2 back to H1, respectively. Likewise, communication between handheld device H2 and vehicle S1 is conducted exclusively in channels designated with code strings H2.1 and S1.2, corresponding to first signal transmission from H2 to S1 and second signal transmission from S1 back to H2, respectively. Furthermore, communication between handheld device H2 and vehicle S2 is conducted exclusively in channels designated with code strings H2.2 and S2.2, corresponding to first signal transmission from H2 to S2 and second signal transmission from S2 back to H2, respectively. This feature of unique channel and communication link is actually different from the prior art in a multi-fold significant manner. First, while each of handheld devices H1 and H2 is pre-registered with vehicle S2, a signal emitted from the vehicle S2 is only respondable by a respective handheld when the emitted signal is generated in response to a signal emitted from the respective handheld. In other words, when the respective handheld is H1 and when handheld H1 has sent a signal intended for vehicle S2, only handheld H1 will respond to the feedback signal from vehicle S2 only. Technically, despite the pre-registration of handheld H1 with vehicle S2, and also handheld H2 with vehicle S2, handhelds H1 and H2 will respond discriminatively, by virtue of the unique channel and communication. Functionally, user of handheld H2 thus would not be bothered by indication of status of vehicle S2 when the user of handheld H2 has not sent any signal for vehicle S2.

FIG. 4 further illustrates unique communication link mechanism using code strings H1.1 and S1.1, corresponding to transmission of a signal from handheld device H1 intended for vehicle S1 and transmission of a feedback signal from vehicle S1 intended for handheld device H1, respectively. The signal sent from handheld device H1 intended for vehicle S1 is a code string including three parts, namely a first part, a second part and a third part. The first part is actually the identification code of handheld device H1, the second part is actually the channel code specifying the channel set in handheld H1 with respect to vehicle S1, and the third part is a code carrying a desire instruction from handheld device H1 to vehicle S1. The feedback signal from vehicle S1 intended for handheld device H1 is a code string also including three parts, namely a first part, a second part and a third part. The first part is actually the identification code of vehicle S1, the second part is actually the channel code specifying the channel set in vehicle S1 with respect to handheld device H1, and the third part is a code carrying a desire instruction from vehicle S1 to handheld device H1.

FIG. 5 is similar to FIG. 4, further illustrates unique communication link mechanism using code strings H1.2 and S2.1, corresponding to transmission of a signal from handheld device H1 intended for vehicle S2 and transmission of a feedback signal from vehicle S2 intended for handheld device H1, respectively. The signal sent from handheld device H1 intended for vehicle S2 is a code string including three parts, namely a first part, a second part and a third part. The first part is actually the identification code of handheld device H1, the second part is actually the channel code specifying the channel set in handheld H1 with respect to vehicle S2, and the third part is a code carrying a desire instruction from handheld device H1 to vehicle S2. The feedback signal from vehicle S2 intended for handheld device H1 is a code string also including three parts, namely a first part, a second part and a third part. The first part is actually the identification code of vehicle S2, the second part is actually the channel code specifying the channel set in vehicle S2 with respect to handheld device H1, and the third part is a code carrying a desire instruction from vehicle S2 to handheld device H1.

FIG. 6 is similar to FIG. 4 or 5, but further illustrates unique communication link mechanism using code strings H2.2 and S2.2, corresponding to transmission of a signal from handheld device H2 intended for vehicle S2 and transmission of a feedback signal from vehicle S2 intended for handheld device H2, respectively. The signal sent from handheld device H2 intended for vehicle S2 is a code string including three parts, namely a first part, a second part and a third part. The first part is actually the identification code of handheld device H2, the second part is actually the channel code specifying the channel set in handheld H2 with respect to vehicle S2, and the third part is a code carrying a desire instruction from handheld device H2 to vehicle S2. The feedback signal from vehicle S2 intended for handheld device H2 is a code string also including three parts, namely a first part, a second part and a third part. The first part is actually the identification code of vehicle S2, the second part is actually the channel code specifying the channel set in vehicle S2 with respect to handheld device H2, and the third part is a code carrying a desire instruction from vehicle S2 to handheld device H2.

Each module will only respond to signals with specific combination of pre-registered part 1 and part 2.

Near-Unique and Unique Identification

In the embodiment of FIG. 2 and FIG. 3, since the pool of available identifications (i.e. 65,536) from which the user can select is high, thus the possibility of accidental match is extremely low, especially when the identity code is not selected by human, as a person would be more likely to select from 1 for a first handheld the person owns, then 2 for a second handheld the person owns, and so on. Of course, in order to reduce the chance of accidental match, the number of binary digits used for defining an identification code should be increased although for many practical purposes the use of a 16 binary digit system should be sufficient. True uniqueness can only be achieved by having the odd be absolute zero, which requires the denominator to be infinitive, or infinite number of bits in the ID code, and obviously it is not possible in practice. It is to be understood that even in the unlikely scenario that two handheld devices have been programmed with the same identification code, it does not automatically mean that vehicles will respond to them the same way. This is because each handheld still has a slight chance having selected the same channel codes with respect to each vehicle during pre-registration process. That is, S1 could be on channel 1 of H1 while the same S1 could be on channel 2 of H2, thus S1 responds only to H1 on code string H1.1 even H1 and H2 have been accidentally programmed with H1 as the common identification code, wherein S1 responds to H2 on code string H1.2. In other words, the chance that a module responding to a signal not intended thereto would be much less that $1/65536$. As can be seen, the communication between each pair of handheld device and secure entity is a two-way unique communication via a pre-registered designated identification and channel. In theory, absolute uniqueness cannot be achieved because the supposedly unique identification is merely near-unique. For practical purposes, unique means near-unique in this description. It is to be understood that there are numerous ways to represent identification besides this binary representation. Thus, the use of this particular binary representation should not be regarded as limiting to the scope of the present invention.

Unlike conventional identification systems, which are mainly for security and uniqueness purposes, the use of a combination an identification code and a channel code allows each pair of handheld device and secure entity to communicate with each other exclusively in a pre-defined channel. Even when more than one secure entity have registered with a handheld device (or vice versa) and a same identification code has been used, only the one that has pre-registered with a same channel code shall be able to respond. It is thus to be understood that, for example in above illustrated Embodiment 1, the wireless signal from handheld device H1 intended for vehicle S1 is recognizable by the receiver in vehicle S1 and is respondable by vehicle S1 only. This embodiment is to be compared with the conventional systems in which when two persons are to have access right, with one of the persons having access right to both vehicles and the other person having access right to only one of the vehicles, at least three separate keys would be needed. As can be understood from above, although there are two vehicles involved with one person having access right to both vehicles and the other person having access right to only one vehicle, only two keys or two handheld devices, i.e. H1, H2 are required. It is envisaged that in a corporation in which there are many employees and many secure premises (e.g. rooms, computers, equipment, etc.), the number of handheld devices needed is also the same as the number of the employees. This is advantageous.

Embodiment 3

Figure 7:
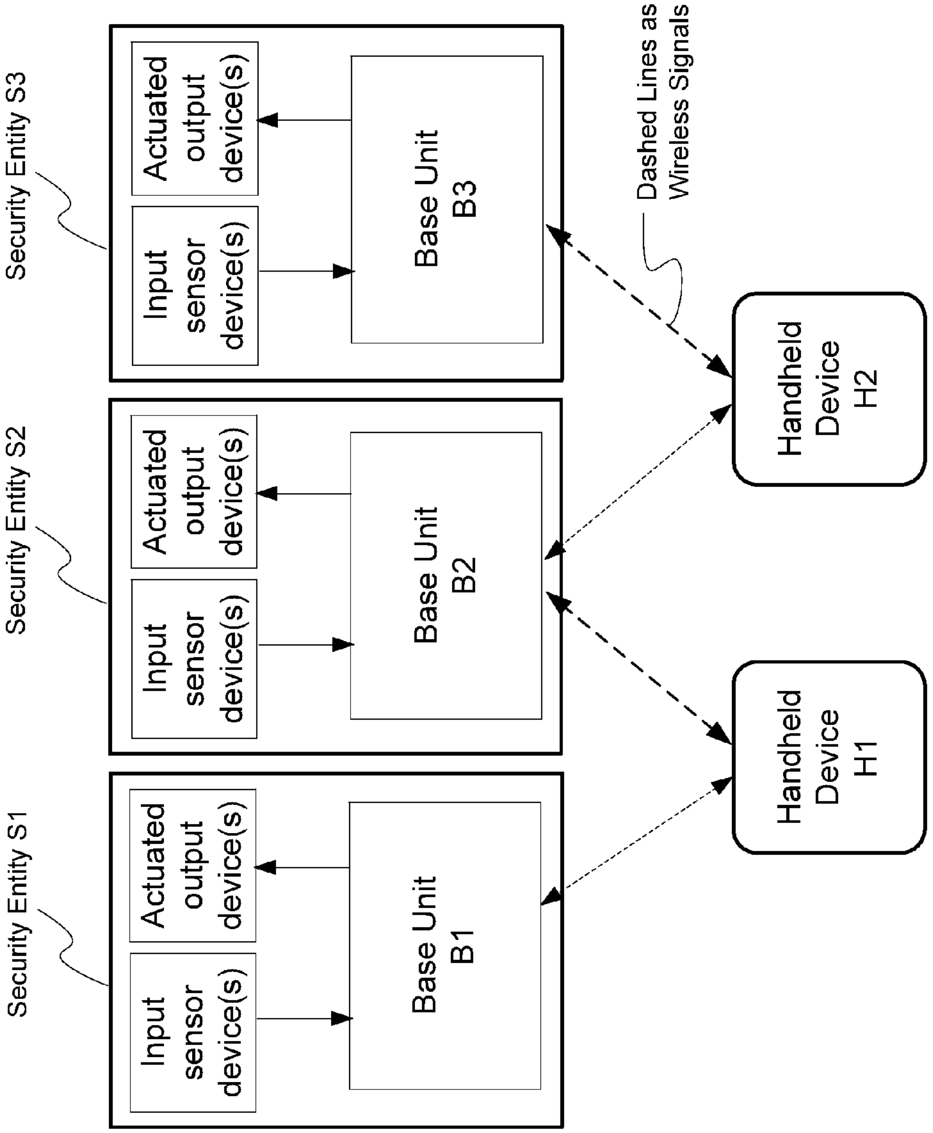
FIG. 7 is a schematic diagram showing different modules and their relationship in yet another embodiment of a security system in accordance with the present invention.

FIG. 7 is a schematic diagram illustrating a third embodiment of a security system in accordance with the present invention. This embodiment is similar to the system of FIG. 2 and FIG. 3 although there are a number of differences. First, instead of having two secure entities, there are three secure entities, namely a first vehicle S1, a residence S2 and a second vehicle S3. There are two persons to gain access although a first person, P1, has access right to S1 and S2 only, while a second person, P2, has access right to the secure entities S2 and S3 only. In other words, both the persons P1 and P2 have common access right to the residence S2 although each of them has access right to the respective vehicle S1 or S3. To gain access to the vehicle S1 and the residence S2, all that the person P1 requires is one handheld device H1. The pre-registration process of each pair of handheld device and secure entity is similar to that in above illustrated Embodiment 2 and will not be repeated here.

The above embodiments are advantageous in that each user only requires one handheld device for controlling or gaining access to multiple secure entities. Specifically, regardless of the number of secure entities to be accessed, the number of device required for each user is always one.

In each of FIG. 1, FIGS. 2 and 3, and FIG. 7, the blocks labeled "input sensor device(s)" and the blocks labeled "actuated output device(s)" are connected to or reside in their respective modules. These blocks are expressed schematically to illustrate that they may as well be some common components existing in, for example, a typical vehicle. For instance, a car door serves merely a removable barrier between interior and exterior of a car. In the context of the present invention, it also serves as an input sensor device, which sends an instant signal signifying open/close events of the secure entity (the car) once they take place as such events are relevant to the secure entity for further processing and action. Furthermore, as a prevalent application, the car door also serves as an actuated output device that can be locked or unlocked by a signal sent from a base unit of a security entity. For another instance, a car horn is typically only actuated by the driver's depressing on the inner portion of a steering wheel of a vehicle. However, in the context of the present invention, it can also be actuated by a signal sent from a base unit of a security entity.

Handheld Device and Key System

In Embodiment 1, each key is designated for a specific function in a particular pre-registered secure entity. However, when the number of secure entities to be accessed is many, many keys would be needed on the handheld device and the handheld device would be crowded with keys. The operation of such handheld device would be cumbersome.

FIG. 9 is a schematic diagram showing an embodiment of a handheld device. In this embodiment, the handheld device has four keys, namely K1, K2, K3 and K3. The handheld device in FIG. 9 is different from that of handheld H1 in Embodiment 1 in that key K1 is for channel selection of an intended security entity. The LCD display of the handheld indicates the last channel selected. All signals emitted from the handheld device will not only carry the handheld device's identification code but also the channel code with respect to the selected secure entity. This means a user can select the secure entity to which he intends to send instructions via the handheld device by adjusting the channel by pressing key K1.

Once the channel has been set, the user may want to send an instruction to the secure entity for performing a certain action. This is achieved by pressing one of the corresponding key K2, K3 and K4 designated for pre-programmed functions. As can be understood, the same set of keys with predefined functionality in a handheld can be used for different secure entities or vehicles. If K2 and K3 are predefined as LOCKED, UNLOCKED for vehicle S1, they can also be used for LOCKED, UNLOCKED for vehicle S2 as long as the respective channel code has been selected by key K1. Thus, each secure entity or vehicle doesn't require its own set of keys on a particular handheld device. This will greatly reduce the number of keys required on the handheld device.

It is to be understood that there are many ways in which key system may be designed to allow a user to select channel and input instructions. The key systems described in this description are not intended to be limiting to the scope of the present invention.

Other Embodiments

In another embodiment, and with reference to FIG. 9, the handheld device is provided with four push buttons K1, K2, K3 and K4, and this time with K4 being dedicated as a channel select button. K1, K2, K3 are dedicated as door LOCK, door UNLOCK, and NULL buttons for a first vehicle, the first secure entity, respectively; K1, K2, K3, can be door UNLOCK, door LOCK, and NULL buttons for an office door, the second secure entity, respectively; K1, K2, K3 can be password AUTHENTICATION, NULL, and NULL buttons for a PC, running a program that is requesting a password, the third secure entity, respectively. As can be seen, despite the handheld device can control access to three secure entities and manipulate the status of three functions, only four keys are used.

In alternative embodiments, commands from the handheld unit(s) are issued through keypad, physical or virtual touchscreen, and such commands are received, interpreted, and processed at the secure entity. As each secure entity can respond to one or more registered handheld units, the secure entity is adapted and configured to keep states and status of each of such individual handheld units, and acts correspondingly. Status can be displayed on a screen, such as LCD panel on the handheld device as described above, or a simple set of lighting devices, such as a group of LEDs at the handheld device. It is to be understood that it is the secure unit instructing the handheld device what to display according to status information administrated within the secure entity. The handheld device may therefore be considered a "dummy" primitive unit merely responsible for transmitting a stream of code representing certain user's command and receiving another stream of code containing exact message to display. If all the doors of the intended vehicle are already locked and the command contains a LOCK instruction, then there is no apparent action taken in the vehicle and no apparent change on the handheld display. The handheld has no memory about the door lock status, as such, it sends out the LOCK instruction even the intended vehicle is already locked. The vehicle however does nothing to the doors when it receives the LOCK instruction.

Various radio frequency (RF) technologies may be used for wireless implementation for links between handheld device and secure entities in accordance with the present invention. Studies have shown that, preferably, frequency of operation is one that does not require specific license pertaining to Title 47 of Code of Federal Regulations from Federal Communication Commission for the United States, such as one in the range of 260-470 MHz, or 902-928 MHz, as long as data type, signal strength, and signaling duty cycle are observed according to the regulations.

Input/output circuitry for wireless transceiving (transmitting and receiving), modem (modulation and demodulation) and codec (encoding and decoding) capabilities are the basic building blocks realizing both handheld devices and base units of the secure entities. For example, transcoder under MT series from LINX Technologies may be used. Reference is made to the product specification published in April 2008 for MT series transcoder Part # LICALTRC-MT and for MT Master Development System Part # MDEV-LICAL-MT, content of which is incorporated here in its entirety. These building blocks for handheld device can be integrated in existing devices, such as utilizing screens and keys readily provided in cellular phone, Pocket PC/PDA (Personal Data Assistant), watch or picture frame integrated key chain ornament, embodiments of which will be elaborated as follows.

As it is understood from the above explained embodiments, one implementation of such a security system is for the car remote keyless entry system. It is envisaged that a user can verify the status of his car as to whether the doors are locked or not, or the security system is activated or not, by way of a visual inspection of his/her handheld device. Alternatively, the handheld device is configured to emit an audible signal reflecting the status. This is to be contrasted with conventional systems in which the user must have the ability to listen from afar or to see the car in line of sight if he/she wishes to do verification having walked away from the car at a distance such as a few tens of feet and beyond.

It is envisaged that in alternative embodiments in accordance with the present invention, the security system can be configured to emit a wireless signal detectable by the associated handheld device(s) and as such the car owner can be immediately notified of theft or tampering. In such embodiments, the output device of the vehicle will send a wireless distress signal to the handheld device(s) with which the vehicle has registered, allowing the owner to take appropriate action in a timely manner.

It is also envisaged that in alternative embodiments in accordance with the present invention, a new secure entity, e.g. a car, residence or a computer, can be purchased without a key. Such embodiments will be similar to the second embodiment or the third embodiment as illustrated in FIGS. 2 and 7. In particular, when having acquired a new secure entity, the user or each of the users will still not require a further handheld device and can use the (or their) existing handheld devices. Each of the handheld devices has a unique identification and a channel code of 20 possibilities. A pre-registration process is needed to establish the unique relationship among the secure entity and the handheld unit(s).

In alternative embodiments, the security system may be realized by integrating additional RF circuitry and software into existing devices and thus avoid creating another piece of hardware to be carried by the user for the new benefit. Usefulness of a cellular phone (or a digital wristwatch) may be augmented with the function of the handheld device as illustrated above. LCD display, keypad or individual push buttons, micro-controller or processor, or antenna, etc. are readily available building blocks sharable by the requirements in the present invention.

Figure 8:
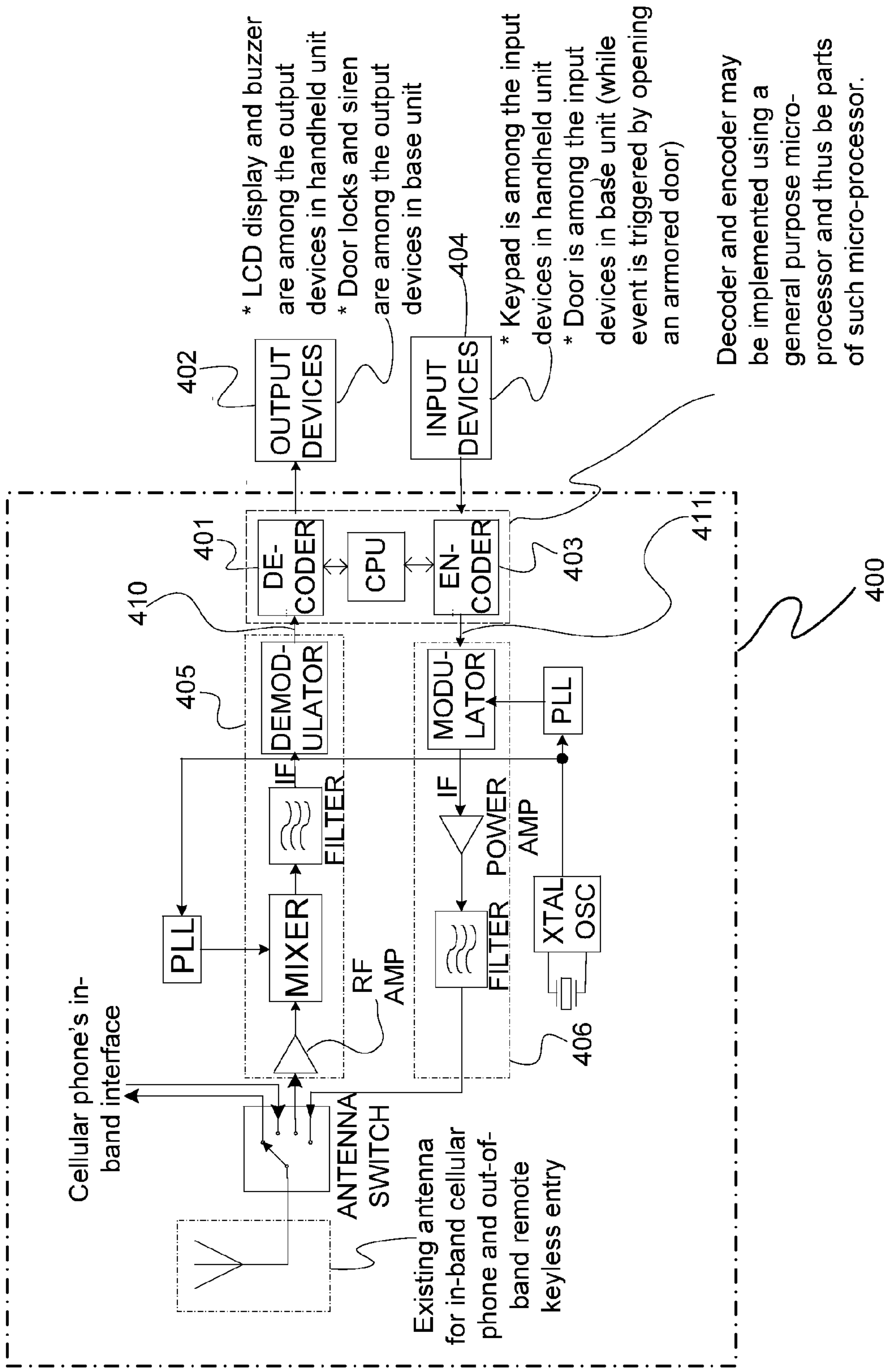
FIG. 8 is a schematic diagram showing functional blocks of an embodiment of a security system in accordance with the present invention.

An implementation for the handheld device or the base unit of the secure entity is illustrated in FIG. 8. An antenna switch, local oscillator and mixer for intermediate frequency generation in a super-heterodyne receiver, demodulation and modulation for amplitude OnOff-Keying, and amplifiers and filters at appropriate stages to condition signal amplitude and frequency compose the additional RF circuitry. The circuitry can be realized in an integrated monolithic semiconductor device. Data decoding, error detection for noise immunity and encoding functions are performed in a micro-controller or processor with respective enhanced software.

It is envisaged that for practical and aesthetic advantages, the handheld unit devices are configured to be as physically compact as possible. As explained above, most if not all data and signal processing is performed in the secure entity. It is to be understood that in most cases most required hardware of the security system in accordance with the present invention resides in the secure entity which may be at a fixed location or at least typically provide relatively more physical space for accommodating the hardware than that of the handheld device otherwise allows. The handheld device sends out a simple signal representing a depressed key as user command, the secure entity that has registered with the handheld device receives, decodes and responds to the signal, such as locking the doors and armoring the security system. Upon intended actions for the command is completed, status of this particular user is updated in the secure entity (e.g. vehicle). Some encoded signals specific to a type of LCD panel and/or an audible buzzer are then sent out from the car as feedback. The handheld device that has registered the car receives and decodes the signals, causing relevant status message to display on its LCD and/or a distinct tone to sound from its buzzer.

It is to be understood that an operation command or request is originated by the user from the handheld device. Such command or request is received remotely by the counterpart secure entity. The secure entity processes the request and automatically sends a status signal back to the handheld device. This signal considered as a feedback signal is received by the handheld device, actuates an on-board display and/or an audible device to represent pertinent information conveyed by the feedback signal.

It is envisaged that the present invention provides a universal platform and is suitable for use in various applications, which benefit the user with a universal handheld device for secured remote access of multiple domains of secure entities. Such domains can be of various types and purposes.

One such domain is for strengthening security in computing. Presently, identification is verified and thus authorization is granted as long as the correct password is entered regardless of the legitimacy of the person entering the password. As each password is merely a piece of information, anyone learns of it as knowledge can use it at will and the possession of the password does not translate to the person necessarily being the legitimate user. Further embodiments in accordance with the present invention add a physical means linked to the legitimate user in the authorization process. It is envisaged that in addition to a valid password, a secure entity which in these embodiments taking the form of a personal computer in the authorization granting computer, implemented in a USB-based dongle device for example, must receive a valid identification from a handheld unit to complete the authorization process, as such greatly reducing possibility of impersonated entry.

Another domain is for room entry, one of the most conventional uses of key. It is envisaged that a handheld device in accordance with the present invention can enter multiple rooms, each room representing a secure entity registered with the handheld device, using a single physical key.

As can be understood, in a further embodiment of a security system in accordance with the present invention, a user can program his/her one handheld device to have Channel 1 for access to vehicle A, Channel 2 for access to room A, Channel 3 to vehicle B, Channel 4 to computer A, Channel 5 to room B, and so on.

In an alternative embodiment, as shown in FIG. 8, a cellular phone manufacturer can have cellular phones manufactured with such built-in handheld devices configured to establish, for example, twenty channels for unique communication with secure entities such as vehicles, residence, etc. The advantages with incorporating the present invention in cellular phone context is that most people nowadays have a cellular phone and existing cellular phone already including a display, command keys and antennas usable and sharable by the transmission and reception of unique signals for communication with secure entities in accordance with the present invention. As such, a cellular phone manufacturer can easily modify the design and adapt it to also function as a security handheld device. Furthermore, most cellular phones have already provided users with password-protected access to the phone itself, which automatically serves as an additional level of protection against unauthorized access to the secure entities registered with the cellular phone.

A further embodiment is similar to that illustrated in FIG. 8. Components to the left of Interface 410 and 411 are in the analogy domain whereas components to the right of the interfaces are in the digital domain. It is to be understood that this further embodiment is concerned with an implementation suitable for the handheld device or the base unit of the secure entity. The following example illustrates how this embodiment in accordance with the present invention works. In this embodiment, the secure entity is a vehicle and the owner of the vehicle intends to arm his car. Upon the owner depresses a button in his remote key fob, a signal is sent from the button (block 404 in key fob in FIG. 8) to an encoder. An encoded digital code containing command of the user's request is then sent from the encoder to a modulator over Interface 411. The modulator provides the signaling suitable for wireless transmission in a radio frequency (RF) band. The RF signal is transmitted from the key fob and received by base unit of a secure entity (e.g. a car). The super-heterodyne receiver in the secure entity converts the incoming RF signal to a fixed intermediate frequency (IF) suitable for detection in later stages of processing by mixing the RF signal with a frequency generated by a local oscillator. The IF signal is demodulated to binary digital signaling, which is further sent to a decoder 401 over Interface 410. A central processing unit (CPU) sees the security arming desire originated from the user and thus locks the doors in block 402 of the car and/or activates the car security system also in block 402 of the car. The secure entity subsequently sends a signal back to the user's remote key fob to notify him that the operation was successfully performed. This feedback signal from car to key fob is processed in a similar fashion as the signal originated from key fob to car. It is encoded and sent to the modulator in the secure entity through its Interface 411. The modulated signal is then sent in RF signaling from the secure entity and received by the key fob. Once it is received by the key fob, the signal is converted to an IF signal for demodulation in the key fob. The demodulated digital signal is then decoded into commands and data necessary to display relevant visual information in block 402 of the key fob and/or to excite relevant audible device also in block 402 of the key fob.

In one embodiment, a given handheld device is suitable for use with multiple secure entities. Definition of keys is as interpreted by each secure entity. Content in the instruction data, as shown in FIGS. 4, 5, and 6, caused by each key is the same regardless of the intended receiving secure entity. It is secure entity's responsibility to correctly interpret the instruction data and take corresponding action; it is the user's responsibility to know which key or combination of keys to use in order for the secure entity to act according to the user's desire. One car, a secure entity, may interrupt K1, as shown in FIG. 9, as the instruction to unlock all doors; however, a second car may interrupt the same K1 as the instruction to lock all doors. A different user manual comes with each secure entity; definition of keys is specified in it for the user to know how each respective secure entity interprets the set of keys. On the other hand, content in the instruction data sent from the secure entity can be universally interrupted by all handhelds as a common protocol, such as an acknowledge signal to cause a ACK icon on a LCD display to lit or a string of ASCII codes to show text on the LCD display for conveying a more elaborated message.

It is envisaged that when the security armed vehicle car is tampered with an attempted break-in and upon a motion sensor in one of the doors in block 404 has detected the attempted break-in, a signal or a third signal is sent from the door (block 404 in car) to an encoder. An encoded digital code containing command of the distress sign is then sent in two routes: (1) from the encoder to a modulator over Interface 411 for wireless transmission to the remote key fob; and (2) from the encoder to a CPU for event administration. In the route to the modulator, the modulator provides the signaling suitable for wireless transmission in a radio frequency (RF) band. The RF signal is transmitted from the car and received by the remote key fob held by the user. The super-heterodyne receiver in the key fob converts the incoming RF signal to a fixed intermediate frequency (IF) suitable for detection in later stages of processing by mixing the RF signal with a frequency generated by a local oscillator. The IF signal is demodulated to binary digital signaling, which is further sent to a decoder 401 over Interface 410. A central processing unit (CPU) sees the distress signal originated from the car and thus excites a buzzer and/or displays an alert signal in block 402 of the key fob. In the route to the CPU, the distress signal is logged in the CPU as an event, decoded and then forwarded to excite a siren as an audible warning signal in block 402 of the car and/or to blink the car headlights as a visual warning signal also in block 402 of the car. In other words, the third wireless signal is for indication of an exception event when a predetermined status is detected by the secure entity, and that the third wireless signal is independent of the first signal from the handheld device and the second signal from the secure entity in response to the first signal.

It should be understood that certain features of the invention, which are, for clarity, described in the context of separate embodiments, may be provided in combination in single embodiments. Conversely, various features of the invention which are, for brevity, described in the context of a single embodiment, may also be provided separately or in any appropriate sub-combinations.

The invention claimed is:

1. A security system, comprising at least a first handheld device, a second handheld device, a first secure entity, and a second secure entity, wherein:— a) said first handheld device and said first secure entity are electronically pre-registered with each other, said first handheld device and said second secure entity are electronically pre-registered with each other, said second handheld device and said first secure entity are electronically pre-registered with each other, and said second handheld device and said second secure entity are electronically pre-registered with each other, with pre-registration of each respective handheld device and secure entity pair establishing a unique channel for the respective handheld device and secure entity pair;

b) each said unique channel is configured to allow two-way communication by encoded wireless signals between the respective handheld device and secure entity pair;

c) the encoded wireless signals are of radio frequency;

d) the encoded signals include a first request signal emitted from the handheld device intended for the secure entity of the respective handheld device and secure entity pair, and a second feedback signal emitted from the secure entity intended for the handheld device of the respective handheld device and secure entity pair, with the second feedback signal generated only in response to the first request signal and actionable by the handheld device of the respective handheld device and secure entity pair and not the other handheld device or other handheld devices;

e) each said first request signal and said second feedback signal in response contains digital coding of at least a first part, a second part and a third part;

f) the first part coding of the first request signal represents an identification of said handheld device of the respective handheld device and secure entity pair, the second part digital coding of the first request signal represents a channel code designated in said handheld device with respect to said secure entity of the respective handheld device and secure entity pair, and the third part coding of the first request signal represents an instruction from said handheld device to said secure entity of the respective handheld device and secure entity pair; and g) the first part coding of the second feedback signal represents an identification of said secure entity of the respective handheld device and secure entity pair, the second part coding of the second feedback signal represents a channel code designated in said secure entity with respect to said handheld device of the respective handheld device and secure entity pair, and the third part coding of the second feedback signal represents an instruction from said secure entity to said handheld device of the respective handheld device and secure entity pair.

2. A security system as claimed in claim 1, wherein said handheld devices are remote control key fobs or cellular phones, and said secure entities are vehicles, premises or computers.

3. A security system as claimed in claim 2, wherein said handheld devices include means for a user to input command for emitting the wireless signal.

4. A security system as claimed in claim 3, wherein said input means is one or more physical and/or virtual touch-screen keys or buttons.

5. A security system as claimed in claim 1, wherein said each first request signal encoding said instruction for a desired predetermined action selected from a group including:

(i) locking or unlocking the first secure entity, (ii) arming or disarming the first secure entity;

(ii) allowing or disallowing access to the first secure entity;

(iii) activating or deactivating the first secure entity; and (iv) checking locked/unlocked status of the first secure entity.

6. A security system as claimed in claim 1, wherein said handheld devices include means for displaying and/or indicating status of said secure entity in the respective handheld device and secure entity pair.

7. A security system as claimed in claim 1, comprising one or more handheld devices registrable with one or more said secure entities.

8. A security system as claimed in claim 1, comprising one or more secure entities registrable with one or more said handheld devices.

9. A security system as claimed in claim 1, wherein at least one said secure entity is configured to emit a third wireless signal for indication of an exception event when a predetermined status is detected by said secure entity, and wherein the third wireless signal is independent of the first and second signals.

10. A security system as claimed in claim 9, wherein the security system is configured such that one of said handheld devices or at least one said handheld device is respondable to the third wireless signal, leading to a corresponding indication on said one handheld device or said at least one handheld device.

* * * * *